(12) United States Patent
Niu et al.

(10) Patent No.: US 11,065,864 B2
(45) Date of Patent: Jul. 20, 2021

(54) HYBRID POLYMERIC STRUCTURE, A METHOD FOR FABRICATING A HYBRID POLYMERIC STRUCTURE AND A METHOD FOR CONNECTING TWO POLYMERIC LAYERS WITH THE HYBRID POLYMERIC STRUCTURE

(71) Applicant: City University of Hong Kong, Kowloon (HK)

(72) Inventors: Xinrui Niu, Kowloon (HK); Yuexing Zhan, Kowloon (HK); Yan Ting Chan, Kowloon (HK); Tsz Ling Wong, Kowloon (HK); Tak Mei Yiu, Kowloon (HK)

(73) Assignee: City University of Hong Kong, Kowloon (HK)

( * ) Notice: Subject to any disclaimer, the term of this patent is extended or adjusted under 35 U.S.C. 154(b) by 353 days.

(21) Appl. No.: 15/822,540

(22) Filed: Nov. 27, 2017

(65) Prior Publication Data
US 2019/0160730 A1    May 30, 2019

(51) Int. Cl.
*B29C 64/106* (2017.01)
*B33Y 10/00* (2015.01)
*B33Y 80/00* (2015.01)
*C08J 7/04* (2020.01)

(52) U.S. Cl.
CPC ............ *B33Y 80/00* (2014.12); *B29C 64/106* (2017.08); *C08J 7/042* (2013.01); *B33Y 10/00* (2014.12); *C08J 2383/00* (2013.01); *C08J 2433/26* (2013.01)

(58) Field of Classification Search
None
See application file for complete search history.

(56) References Cited

U.S. PATENT DOCUMENTS 6,331,578 B1 *  12/2001  Turner ................. C08F 283/12
                                                    523/105
2003/0175410 A1 *  9/2003  Campbell ............... A61L 27/38
                                                    427/2.24

FOREIGN PATENT DOCUMENTS

WO   WO 2015/200189 A1 * 12/2015 ............ B29C 35/04
WO   WO 2016/154148     *  9/2016 ............... A61F 2/02

* cited by examiner

*Primary Examiner* — Frank J Vineis
*Assistant Examiner* — Nicole T Gugliotta
(74) *Attorney, Agent, or Firm* — Renner Kenner Greive Bobak Taylor & Weber

(57) ABSTRACT

A hybrid polymeric structure, a method for fabricating a hybrid polymeric structure and a method for connecting two polymeric layers with the hybrid polymeric structure, the hybrid polymeric structure including a first polymeric material arranged in a first three-dimensional network, wherein the first three-dimensional network defines a cavity with a plurality of interconnected portions within the first three-dimensional network; and a second polymeric material substantially occupies the cavity of the first three-dimensional network, and defines a second three-dimensional network; wherein the first three-dimensional network and the second three-dimensional network are arranged to physically engage with each other so as to form a unified structure combining the first polymeric material and the second polymeric material.

5 Claims, 10 Drawing Sheets

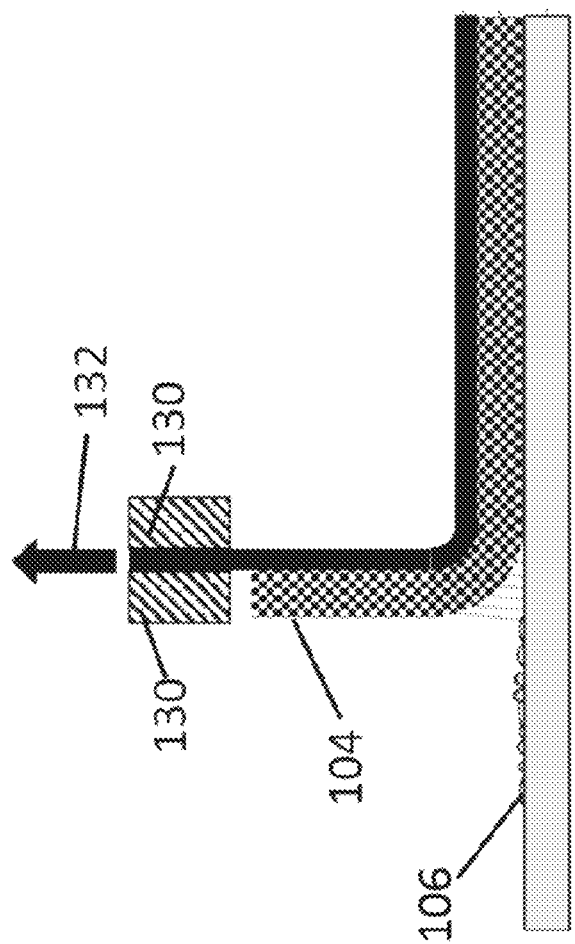

HYBRID POLYMERIC STRUCTURE, A METHOD FOR FABRICATING A HYBRID POLYMERIC STRUCTURE AND A METHOD FOR CONNECTING TWO POLYMERIC LAYERS WITH THE HYBRID POLYMERIC STRUCTURE

TECHNICAL FIELD

The present invention relates to a hybrid polymeric structure, a method for fabricating a hybrid polymeric structure and a method for connecting two polymeric layers with the hybrid polymeric structure, although not exclusively, to a hydrophobic-hydrophilic hybrid polymer.

BACKGROUND

Composite material may be made from two or more materials, in which these materials may include significantly different physical and chemical properties. When the constituent materials are combined, a material with characteristics different from the individual components will be obtained.

For example, concrete is a composite that is made of loose stones held with a matrix of cement, providing a large mechanical strength as compared with its constituent components. These example hybrid materials may show characteristics in between the two original components or even new properties. Thus, hybrid materials may widen the scope of application in various fields.

SUMMARY OF THE INVENTION

In accordance with a first aspect of the present invention, there is provided a hybrid polymeric structure comprising a first polymeric material arranged in a first three-dimensional network, wherein the first three-dimensional network defines a cavity with a plurality of interconnected portions within the first three-dimensional network; and a second polymeric material substantially occupies the cavity of the first three-dimensional network, and defines a second three-dimensional network; wherein the first three-dimensional network and the second three-dimensional network are arranged to physically engage with each other so as to form a unified structure combining the first polymeric material and the second polymeric material.

In an embodiment of the first aspect, the first polymeric material entangles with the second polymeric material.

In an embodiment of the first aspect, the first polymeric material and the second polymeric material are not chemically bound together.

In an embodiment of the first aspect, one or both of the first and the second polymeric materials are arranged to maintain the unified structure when subjected to an external force.

In an embodiment of the first aspect, the first polymeric material and the second polymeric material include different chemical and/or physical properties.

In an embodiment of the first aspect, the first polymeric material and the second polymeric material include different water affinities.

In an embodiment of the first aspect, the first polymeric material and the second polymeric material include different mechanical stiffness.

In an embodiment of the first aspect, the first polymeric material is arranged in a scaffold structure.

In an embodiment of the first aspect, the scaffold structure comprises a plurality of two-dimensional network structures arranged in a stack.

In an embodiment of the first aspect, each of the plurality of two-dimensional network structures partially overlaps with an adjacent two-dimensional network structure.

In an embodiment of the first aspect, each of the plurality of two-dimensional network structures chemically binds with an adjacent two-dimensional network structure.

In an embodiment of the first aspect, the first polymeric material and the second polymeric material include respectively a hydrophobic material and a hydrophilic material, or vice versa.

In an embodiment of the first aspect, wherein the first polymeric material and the second polymeric material include silicone and hydrogel respectively.

In an embodiment of the first aspect, the unified structure is mechanically flexible.

In accordance with a second aspect of the present invention, there is provided a method for fabricating a hybrid polymeric structure, comprising the steps of: constructing a first three-dimensional network with a first polymeric material, wherein the first three-dimensional network defines a cavity with a plurality of interconnected portions within the first three-dimensional network; and filling the cavity of the first three-dimensional network with a second polymeric material, wherein second polymeric material defines a second three-dimensional network; wherein the first three-dimensional network and the second three-dimensional network are arranged to physically engage with each other so as to form a unified structure combining the first polymeric material and the second polymeric material.

In an embodiment of the second aspect, the first polymeric material entangles with the second polymeric material.

In an embodiment of the second aspect, the first polymeric material is arranged in a scaffold structure.

In an embodiment of the second aspect, the step of constructing the first three-dimensional network with the first polymeric material comprises the step of fabricating and stacking a plurality of two-dimensional network structures to form the scaffold structure.

In an embodiment of the second aspect, the step of constructing the first three-dimensional network with the first polymeric material comprises the step of printing each of the plurality of two-dimensional network structures.

In an embodiment of the second aspect, the plurality of two-dimensional network structures are printed by 3D printing.

In an embodiment of the second aspect, the step of constructing the first three-dimensional network with the first polymeric material comprising the step of curing the plurality of two-dimensional network structures to form the scaffold structure.

In an embodiment of the second aspect, the first three-dimensional network is constructed in a precursor of the second polymeric material such that the cavity of the first three-dimensional network is filled with the second polymeric material after curing of the precursor of the second polymeric material.

In an embodiment of the second aspect, the first polymeric material and the second polymeric material are cured simultaneously.

In an embodiment of the second aspect, the step of filling the cavity of the first three-dimensional network with the second polymeric material comprises the step of filling the cavity of the first three-dimensional network with a precursor of the second polymeric material and curing the precursor of the second polymeric material.

In an embodiment of the second aspect, the precursor of the second polymeric material includes a liquid precursor.

In accordance with a third aspect of the present invention, there is provided a method for connecting two polymeric layers with the hybrid polymeric structure in accordance with the first aspect, comprising the steps of: providing a portion of a first polymeric layer of the first polymeric material with the first three-dimensional network; and providing a portion of a second polymeric layer of the second polymeric material with the second three-dimensional network.

In an embodiment of the third aspect, the method further comprises the step of: preparing the base with the first polymeric material; printing a plurality of two-dimensional network structure with the first polymeric material so as to form the first three-dimensional network on the base; and curing the base and the first three-dimensional network simultaneously.

In an embodiment of the third aspect, the method further comprises the step of pouring a precursor of the first polymeric material into a mold to form the base.

In an embodiment of the third aspect, the base formed by first polymeric material is prepared and/or printed by using three-dimensional printing.

BRIEF DESCRIPTION OF THE DRAWINGS

Embodiments of the present invention will now be described, by way of example, with reference to the accompanying drawings in which:

FIG. 7B is an illustration of the experimental setup for bonding strength measurement of FIG. 7A;

DETAILED DESCRIPTION OF THE PREFERRED EMBODIMENT

The inventors have, through their own research, trials and experiments, devised that fabrication of hybrid polymeric structures may involve utilization of harmful chemical to bond two polymeric materials together. For example, with proper chemical treatment, two polymeric materials may be "glued" together by chemically linking the molecules at the interface between the two polymers.

Meanwhile, there may be some restrictions applied on the choice of materials based on different applications such as flexible electronics, microfluidic devices, soft robotics, and artificial tissues/organs. Without choosing proper materials and/or the binging/bonding methods, the hybrid polymeric structure may yield undesirable mechanical properties such as low fracture toughness, which may substantially affect the hybrid polymeric structure being applied in these applications.

Figure 1:
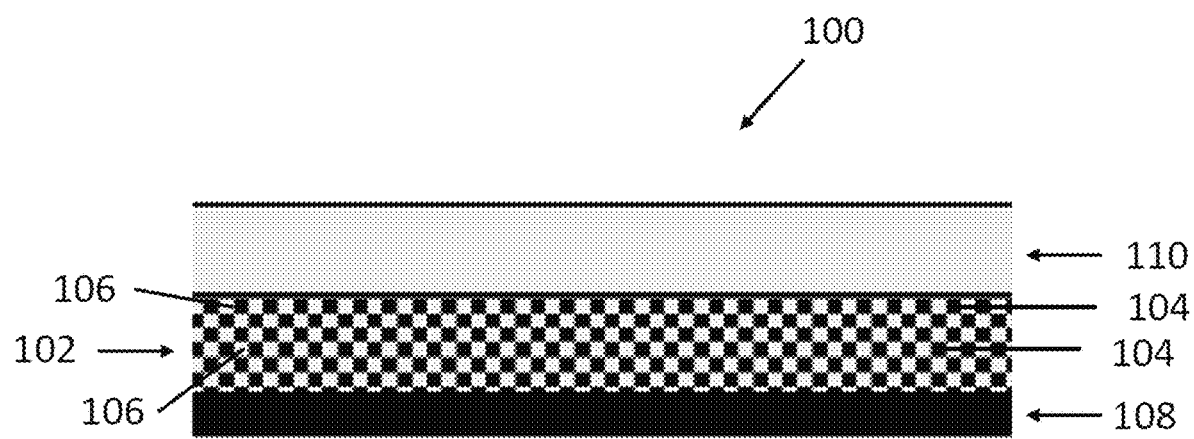
FIG. 1 is an illustration of a hybrid polymeric structure in accordance with one embodiment of the present invention.

With reference to FIG. 1, there is shown an embodiment of a hybrid polymeric structure 102 comprising: a first polymeric material 104 arranged in a first three-dimensional network, wherein the first three-dimensional network defines a cavity with a plurality of interconnected portions within the first three-dimensional network; and a second polymeric material 106 substantially occupies the cavity of the first three-dimensional network, and defines a second three-dimensional network; wherein the first three-dimensional network and the second three-dimensional network are arranged to physically engage with each other so as to form a unified structure 100 combining the first polymeric material 104 and the second polymeric material 106.

In this embodiment, the hybrid polymeric structure 102 is sandwiched between two layers of material, namely a first polymeric layer 108 at the bottom and a second polymeric layer 110 on the top. The first and the second polymeric layer (108 and 110) may be respectively formed with the same first and second polymeric material (104 and 106), and are preferably connected by the sandwiched hybrid polymeric structure 102 to form a combined layer of polymer include both the first and the second polymeric materials (104 and 106) therein.

Each of the first polymeric layer 108 and the second polymeric layer 110 include a portion which contributes to the hybrid polymeric structure 102 in the middle, these portions may be defined with physical/mechanical structures which may entangle or engage with each other, such that the two polymeric layers may be physically inseparable.

In some alternative embodiments, the hybrid polymeric structure 102 is not sandwiched between layers of material as shown in FIG. 1. For example, the hybrid polymeric structure 102 may be a standalone unified structure with inseparable networks of the first and the second polymeric materials, or the hybrid polymeric structure 102 may be provided on a base which may be suitable for other applications.

Preferably, the hybrid polymeric structure 102 comprises a first polymeric material 104 arranged in a first three-dimensional network, such as a scaffold structure. In the scaffold structure, there may be a plurality of branches and nodes which combine define a cavity with a plurality of interconnected portions within the scaffold structure.

The cavity defined by the scaffold structure or the first polymeric material 104 may be occupied by a second polymeric material 106. As the cavity includes a plurality of interconnected portions, the second polymeric material 106 may define a second three-dimensional network when it fills the interconnected portions. As a result, the first three-dimensional network and the second three-dimensional network physically are arranged to engage with each other to form a unified structure 100.

In such interconnected network structure, the first polymeric material 104 and the second polymeric material 106 are not chemically bound together, however the first polymeric material 104 entangles with the second polymeric material 106, therefore the two polymeric materials are generally not separable, unless the interconnected network structure is destroyed. One or both of the first and the second polymeric materials may maintain the unified structure 100 when subjected to an external force, for example, when the unified structure 100 is subjected to a pulling force attempting to separate the entangled first and second three-dimensional networks.

Figure 2:
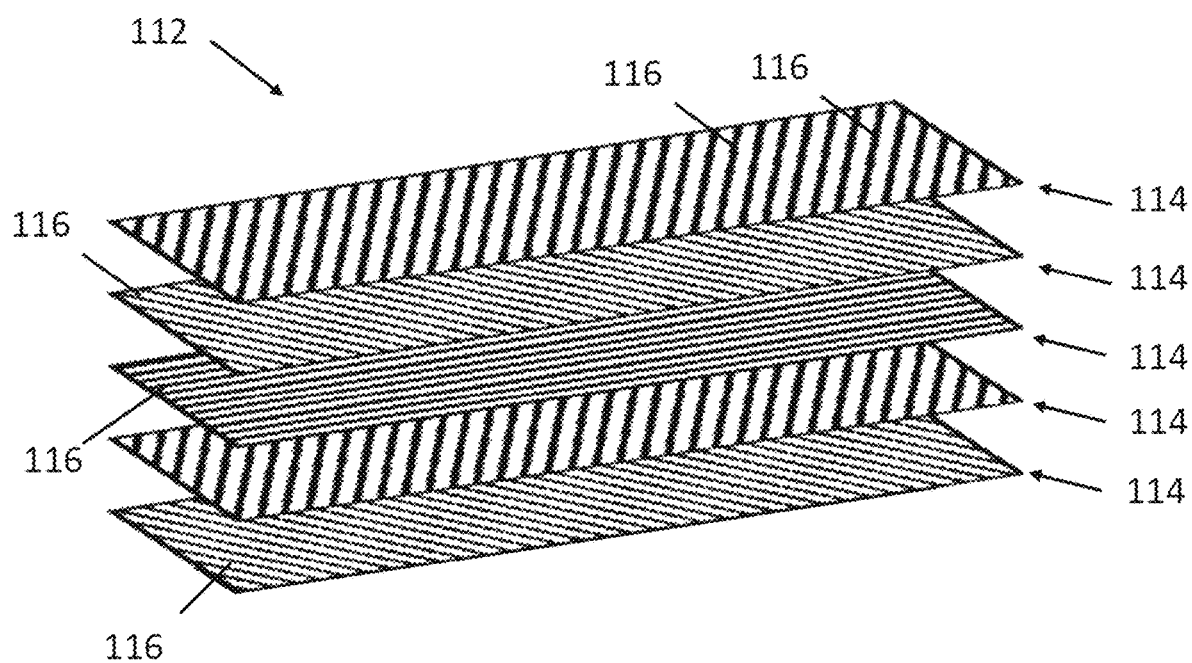
FIG. 2 is an illustration of a scaffold structure in accordance with one embodiment of the present invention.

Preferably, the scaffold structure may comprise a plurality of two-dimensional network structures arranged in a stack. Referring to FIG. 2, there is provided an example of a five-layer scaffold structure 112. In each of the individual layer, an openwork may be constructed with parallel patterns, and the orientations of these parallel patterns in different layers may be different.

In addition, each of the plurality of two-dimensional network structures 114 partially overlaps with an adjacent two-dimensional network structure. Referring to FIG. 2, parallel structures 116 in adjacent layers partially overlaps with each other to form connection nodes at the interface between the two adjacent layers.

Preferably, each of the plurality of two-dimensional network structures 114 chemically binds with an adjacent two-dimensional network structure, e.g. at the connection nodes or the overlapping areas of the two adjacent layers. Optionally or additionally, the scaffold structure 112 may also chemically bind to a base or a solid piece in other example embodiments.

Alternatively, other patterns may be defined in each of the layers, such as but not limited to a net, a mesh, a web, a lattice or any porous pattern, such that the scaffold structure 112 with the interconnected cavity network is formed when the individual layers of material are combined as a multilayer stack.

Figure 3A:
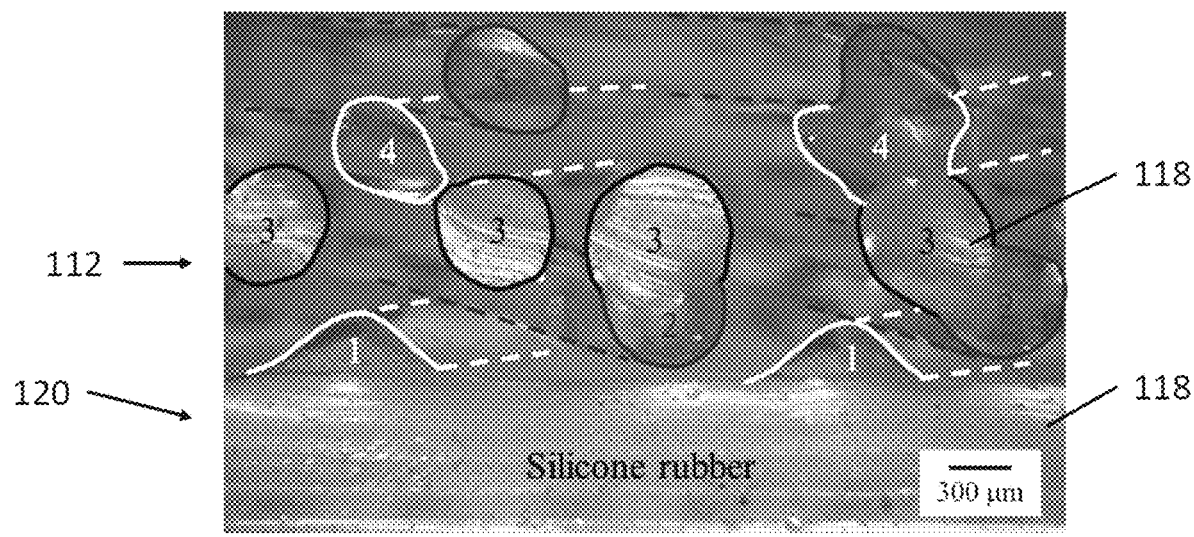
FIGS. 3A and 3B are images showing cross-sectional views of a scaffold structure and a top view thereof in accordance with one embodiment of the present invention.
Figure 3B:
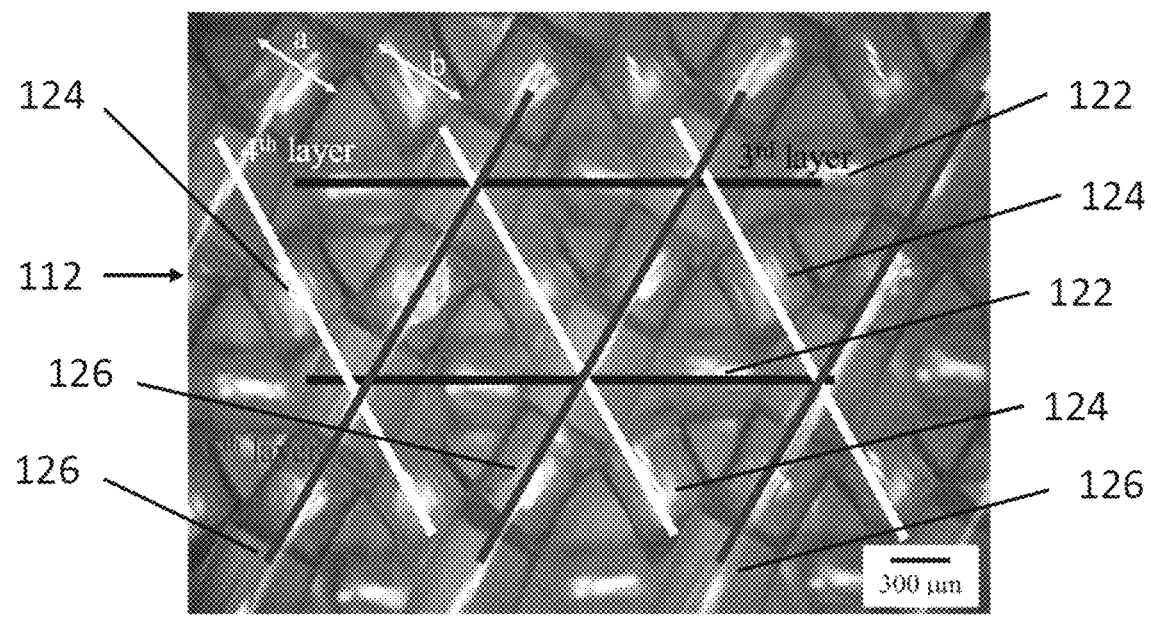

With references to FIGS. 3A and 3B, there is provided an example embodiment of a scaffold structure 112 of a polymeric material 118, such as a hydrophobic material. Referring to FIG. 3A, the hydrophobic material such as silicone or silicon rubber is arranged in a stack similar to the embodiment in FIG. 2, which provides a five-layer scaffold structure 112. The scaffold structure 112 is further bound to a base or a solid piece/cuboid 120 arranged to mechanically support the scaffold structure 112.

Preferably, the scaffold structure 112 or the plurality of two-dimensional network structures 114 may be fabricated using 3D printing, such as extrusion-based 3D printing. Alternatively, other manufacturing methods such as laser sintering or fused deposition method may be applied. The multilayer stack may be substantially cured by different methods such as but not limited to photo-curing, heat-curing or self-curing, such that a unified structure 100 is obtained.

In addition, the base or the solid piece/cuboid 120 may also be printed with the polymeric material 118 prior to printing each of the plurality of two-dimensional network structures 114 with the same polymeric material.

Alternatively, the scaffold structure 112 or the three dimensional network of the polymeric material may be fabricated using any method as appreciated by a person skilled in the art. For example, a three dimensional polymeric structure may be fabricated using a "bread baking" technique in which open cell structures may be defined during the baking and/or the curing of the polymer. It is also possible that the open cell structures or the cavities may be formed after the polymerization step of the polymer, such as by dissolving or removing portions of the polymer after curing.

In an example fabrication process, a silicon rubber precursor with a viscosity about several hundred Pascal-second (PaS) at high shear rates and several thousand PaS at low shear rates may be printed into a solid cuboid 120 via extrusion 3D printing using a direct writing protocol. Five layers of silicon rubber may be then printed on top of the solid cuboid 120 with a printing speed about 10 mm/s and a printing pressure about 0.6 MPa. The multilayer stack may be adopted to a curing process at 130° C. for 15 minutes and substantially becomes a cured scaffold structure 112. Referring to FIG. 3A, there is shown a side view of the cured scaffold structure 112, wherein the thickness of each layer is 0.35 mm.

Preferably, each individual layer 114 may be arranged with a parallel pattern, forming connection branches that partially overlap with the branches in adjacent layers, wherein a specified distance is defined between two branches. For example, the branches may be separated by a gap of about 0.3 mm, which may also be larger or smaller based on different designs or requirements of the hybrid polymeric structure.

The distance between two adjacent connection branches and the diameter of an individual connection branch may further define a filling ratio of the second polymeric material 106 (e.g. hydrophilic material). The filling ratio represents the area covered the hydrophilic material versus the total area covered by both hydrophobic and hydrophilic materials, which may be used to calculate the bonding strength of the hybrid polymeric material.

Preferably, with reference to FIG. 3B, there is shown a top view of a scaffold structure 112, in which the lines illustrates the orientations of the branches in the $3^{rd}$ to the $5^{th}$ layers in the scaffold structure 112. The horizontally parallel connection branches of the $3^{rd}$ layer 122, which is partially covered by the parallel connection branches of the $4^{th}$ layer 124, wherein the $4^{th}$ layer is further partially covered by the parallel connection branches of the $5^{th}$ layer 126. In this example, the $1^{st}$ and the $2^{nd}$ layers are not observable through such top view as these layers have the same alignment to the $4^{th}$ and $5^{th}$ layers respectively, however in some other example embodiments, the plurality of layers of the two-dimensional networks may be all arranged in different orientations.

In this example, the diameter an individual connection branch and the distance between two adjacent connection branches are denoted as a and b, respectively, wherein the filling ratio is defined as $b/(a+b)$. Thus, the filling ratio in this example is defined as $[0.3/(0.3+0.6)]$, which is 0.33. A positive correlation between the bonding strength and the filling ratio may only hold when the filling ratio is optimized, which may depend on the mechanical properties of the hydrophilic and hydrophobic materials and the thickness of each layer (e.g. 0.35 mm in this example).

Figure 4:
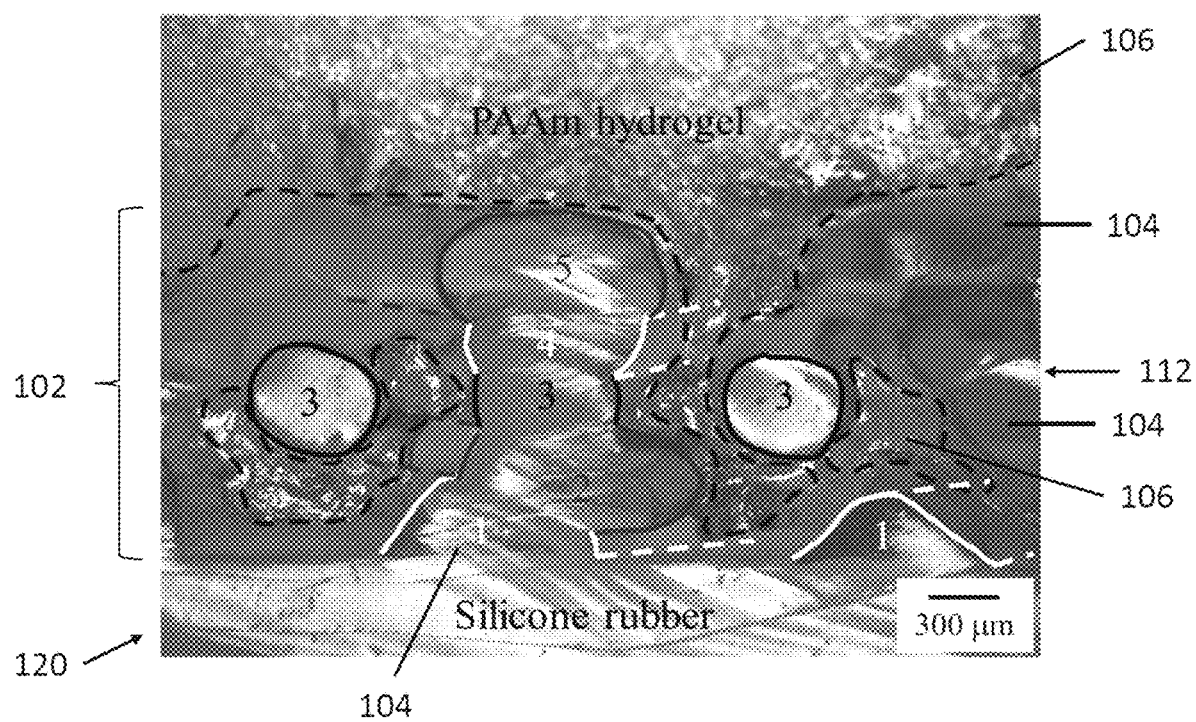
FIG. 4 is an image showing a cross-section view of a hybrid polymeric structure in accordance with one embodiment of the present invention.

With reference to FIG. 4, there is provided an example embodiment of two polymeric layers connected by a hybrid polymeric structure 102. The two polymeric layers include a hydrophobic material (first polymeric material 104) and a hydrophilic material (second polymeric material 106). The hydrophilic and hydrophobic materials may have different chemical and/or water affinities and/or mechanical properties. Alternatively, the hydrophilic material may be the first polymeric material 104 and the hydrophobic material may be the second polymeric material 106, depending on which material is less viscous to act as a filling polymeric material.

In this example, a hydrophilic material such as hydrogel is less viscous which is more suitable to act as a filling polymeric material as compared with the hydrophobic polymeric material such as silicon rubber. Both silicon rubber and hydrogel are mechanically flexible, therefore the unified structure 100 combining the both is also mechanically flexible.

Referring to FIG. 4, hydrogel is filled into the cavities defined in a cured five-layer scaffold structure 112 constructed by silicon rubber. The hydrogel may be filled into the cavities with an aid of vacuum and/or other mechanical means. The hydrogel may be cured by different methods such as but not limited to photo-curing, heat-curing or self-curing, such that the hydrogel and the silicon rubber are physically entangled, substantially forming a hybrid polymeric structure 102.

Optionally, cure-related materials such as crosslinkers, including but not limited to N,N'-methylenebisacrylamide (MBAA), ethylene glycol dimethacrylate (EGDMA), tetramethylethylenediamine (TEMED), oxidized dextrins, etc.; and photoinitiators, including but not limited to Irgacure 2959, 2,2-dimethoxy-2-phenylacetophenone (DMAP), champhorquinone (CQ), etc., may be added to the precursor of the filling polymeric material.

In an example fabrication process, a cured silicon rubber scaffold structure 112 (such as the one as shown in FIGS. 3A and 3B) may be filled with a mixture of polyacrylamide (PAAm) hydrogel precursor, a crosslinker MBAA, and a photoinitiator Irgacure 2959. Vacuum may be applied during the filling process such that all the cavities of the scaffold structure 112 are thoroughly occupied. The PAAm hydrogel may then be photo-cured under a UV light for 45 minutes. As a result, the PAAm hydrogel and the silicon rubber are arranged to substantially physically entangle into a hybrid polymeric structure 102.

Figure 5:
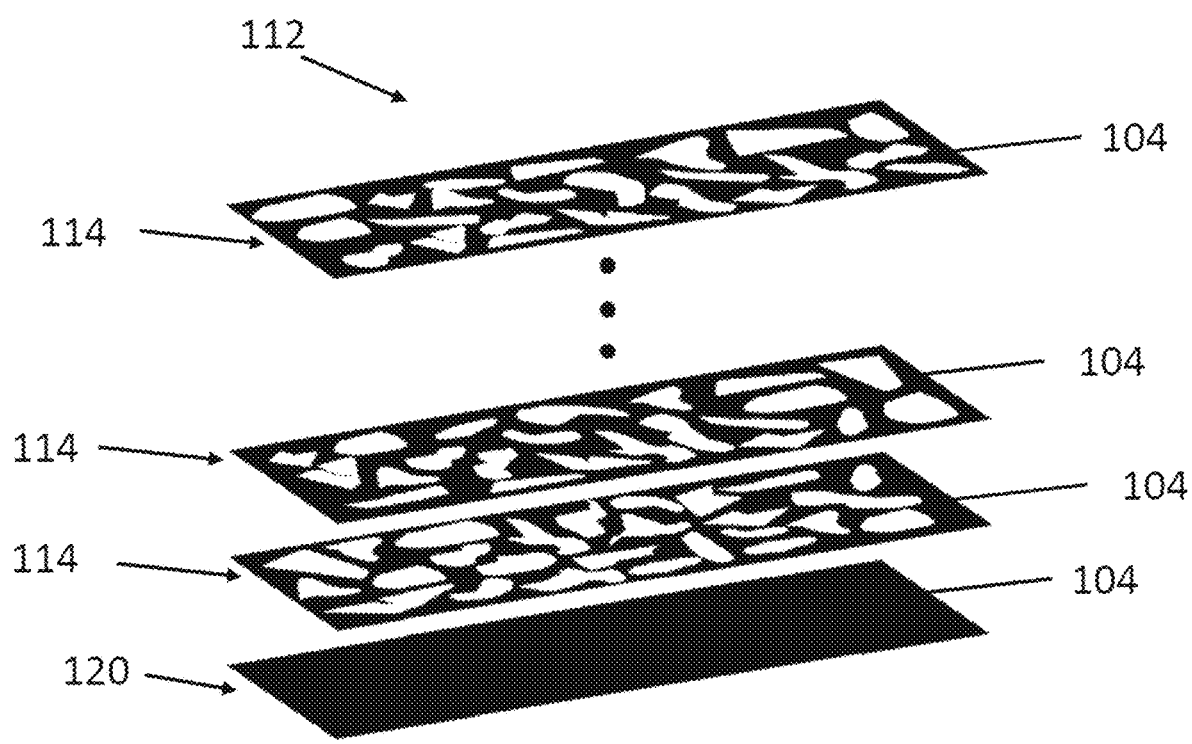
FIG. 5 is an illustration showing a fabrication process of the scaffold structure of the hybrid polymeric structure in accordance with one embodiment of the present invention.
Figure 6:
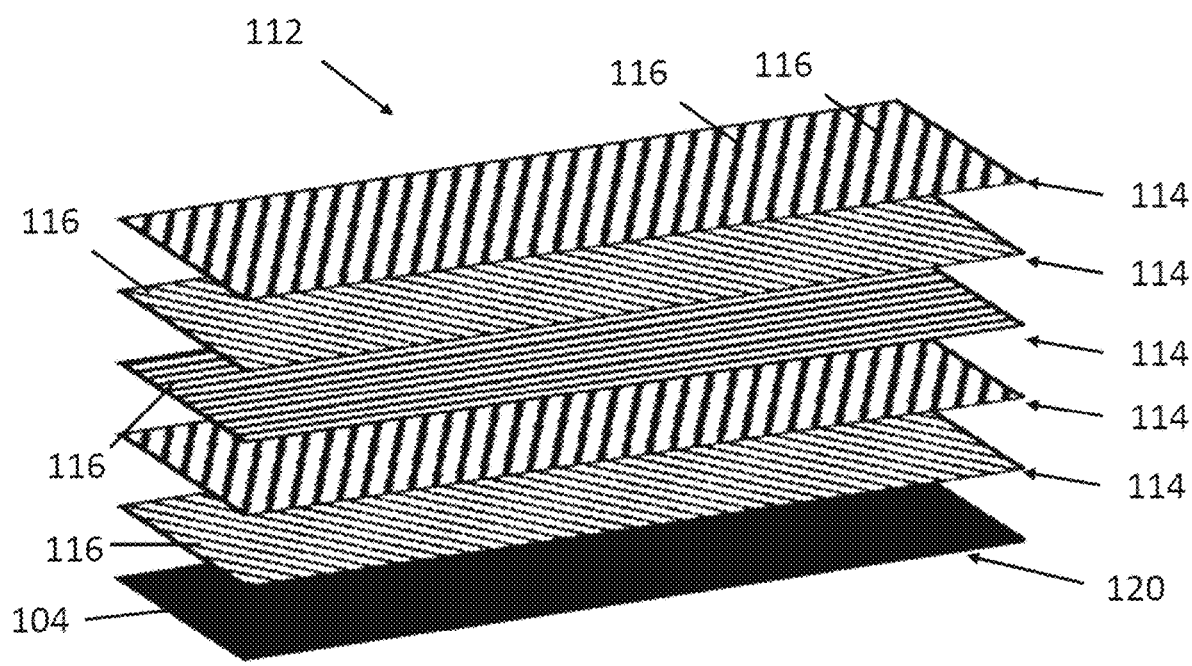
FIG. 6 is an illustration showing an alternative fabrication process of the scaffold structure of the first polymer in accordance with one embodiment of the present invention.

With reference to FIGS. 5 and 6, there is shown an example method for fabricating a hybrid polymeric structure 102 in accordance with an embodiment of the present invention. The fabrication method comprises the steps of constructing a first three-dimensional network with a first polymeric material 104, wherein the first three-dimensional network defines a cavity with a plurality of interconnected portions within the first three-dimensional network; and filling the cavity of the first three-dimensional network with a second polymeric material 106, wherein second polymeric material 106 defines a second three-dimensional network; wherein the first three-dimensional network and the second three-dimensional network are arranged to physically engage with each other so as to form a unified structure 100 combining the first polymeric material 104 and the second polymeric material 106.

In this embodiment, the fabrication of a multilayer scaffold structure 112 may comprise steps of constructing plurality of two-dimensional network structures 114 on top of a base 120 with a first polymeric material 104. Each layer of the network structure may contain cavities within and being constructed by a printing method such as 3D printing. A curing step may be involved to cure a stack of multilayer structure to obtain the multilayer scaffold structure 112.

Preferably, referring to FIG. 5, a solid piece 120 may be printed with the first polymeric material 104 via 3D printing. The shape of the solid piece can be arbitrary as long as the two-dimensional network structures 114 can be constructed adjacent to it. A First layer of the two-dimensional network structures 114 with defined cavities, which can be a net, a mesh, a web, a lattice or any porous pattern, are printed on top of the solid piece. The first layer of the network and the solid piece partially overlap and are cured chemically simultaneously. More preferably, a second layer of the two-dimensional network structures 114 with defined cavities is printed, partially covers, and cured chemically with the first layer of the two-dimensional network structures 114. Optionally, more layers of the two-dimensional network structures 114 can be constructed on top of the preceding layers in the same way, such that a multilayer scaffold structure 112 is obtained.

Optionally or additionally, each layer of the two-dimensional network structure may further include several "mini layers" to adjust the thickness of the scaffold structure 112. Each mini layer fully covers the preceding mini layers and coincides with the preceding main layer.

The fabrication of a hybrid polymeric material further comprises step of filling the cavities of the first three-dimensional network with a second polymeric material 106, forming a second three-dimensional network such that the first and the second polymeric material 106 are physically entangled with each other.

As one preferable option, the scaffold structure 112 may be printed in a liquid precursor of the second polymeric material 106, the scaffold structure 112 and the second polymeric material 106 may be cured simultaneously such that the second polymeric material 106 fills the cavities of the scaffold structure 112.

Alternatively, the scaffold structure 112 may be printed with or without a third supporting material, and the scaffold may be cured first. The cured scaffold structure 112 may then be filled with the second polymeric material 106 by either receiving the liquid precursor of the second polymeric material 106 or by immersing the cured scaffold structure 112 into the liquid precursor. In addition, the liquid precursor of the second polymeric material 106 may be poured into a mold with the cured scaffold structure 112 therein. Vacuum and/or mechanical push may be applied to facilitate the precursor moves into the cavities. After proper curing process, the hybrid polymeric structure 102 will be obtained.

Preferably, referring to FIG. 6, there is provided with an example of a five-layer scaffold structure 112 printed with the first polymeric material 104 such as silicon rubber on top of a supportive structure such as a solid cuboid 120. Each layer of the structure is an openwork with parallel patterns oriented in different directions. The network within each layer partially overlaps with the preceding layer, forming a first three-dimensional network. The first three-dimensional network and the solid cuboid 120 are integrated together by a curing method such as heat-curing. A precursor of the second polymeric material 106 such as PAAm hydrogel is poured into the scaffold structure 112 under vacuum to fill the cavities of the scaffold structure 112. After proper curing method such as photo-curing, the PAAm hydrogel and the silicon rubber are physically entangled into a hybrid structure.

These embodiments may be advantageous in that, the hybrid polymeric structure in accordance with the present invention provides a fabrication method that is more flexible in the choice of materials, less harmful to the operators, and an improved mechanical integrity of the hybrid polymeric structure.

Advantageously, with the use of 3D printing technique, the choice of materials no longer limits on those with sufficient toughness, many of the widely used hydrogel materials such as PAAm, agar and gelatin may be used in fabricating the hybrid polymeric structure 102. In addition, the first and the second polymeric materials are physically entangled with each other, that is, no harmful chemical is required to link these materials together. Less environmental, health, and safety (EHS) concern will be made when the hybrid polymeric structure is applied to the end-product such as artificial tissue and/or organs.

In addition, with an enhanced mechanical property of the hybrid polymeric structure fabricated in accordance with the embodiments of the present invention, the hybrid polymeric structure may be further applied in other technical fields such as flexible electronics, microfluidic devices, and soft robotics.

Figure 7A:
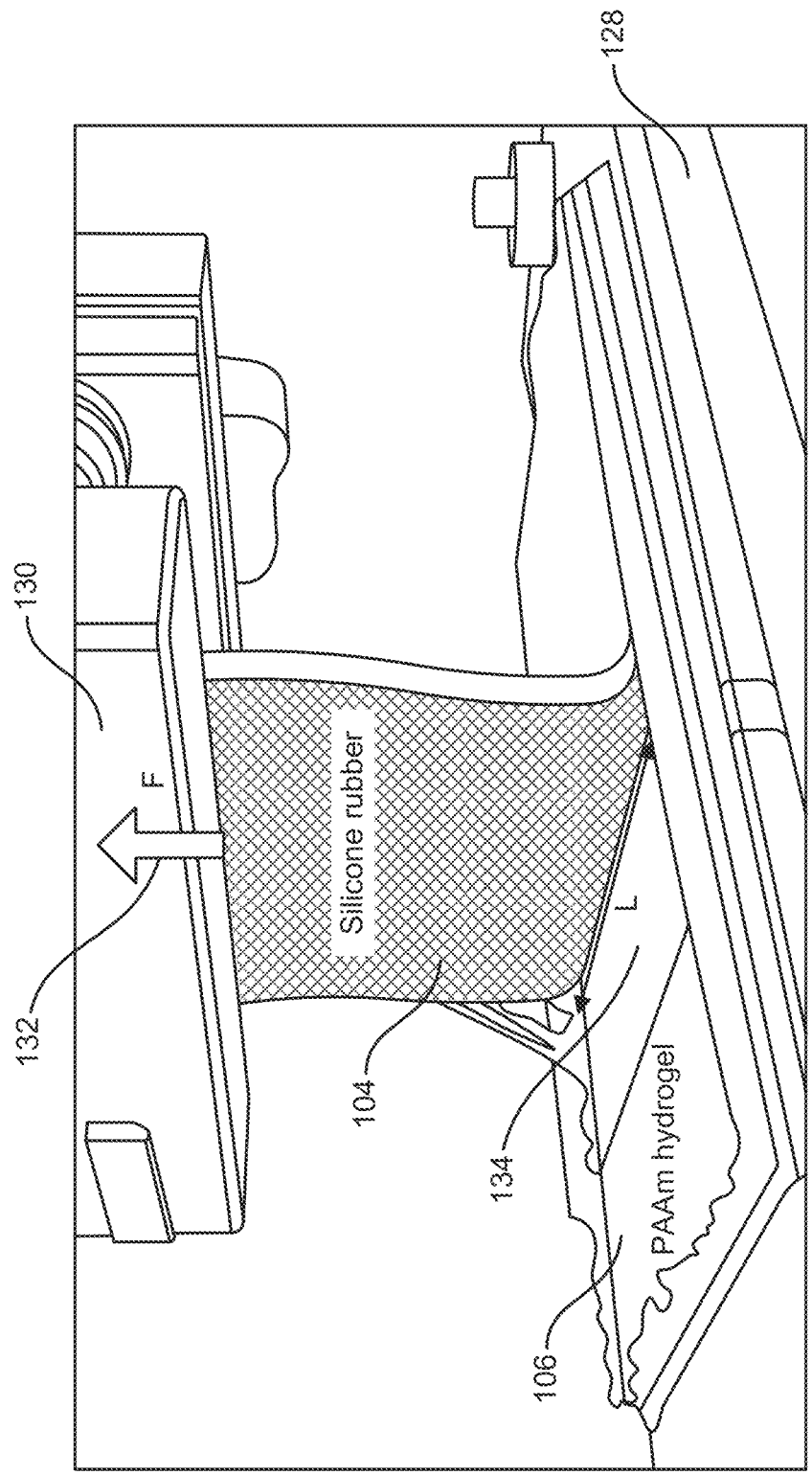
FIG. 7A is a photographic image showing an experimental setup for bonding strength measurement on the hybrid polymeric structure of FIG. 1.

The inventors have performed experiments for characterizing the mechanical performances of the hybrid polymeric structure 102 in accordance with the embodiments of the present invention. Referring to FIGS. 7A and 7B, there are shown an experimental setup for examining the mechanical integrity of the hybrid polymeric structure 102. The hybrid polymeric structure 102 is placed on a 90-degree peeling test device 128, wherein the first polymeric material 104 (silicon rubber) is peeled apart from the second polymeric material 106 (PAAm hydrogel) by a pair of grips 130 with an upward force 132. The measured peeling strength, which represents the bonding strength between the silicon rubber and the PAAm hydrogel, is defined as force 132 over length of the scaffold structure 112 (134).

Figure 7C:
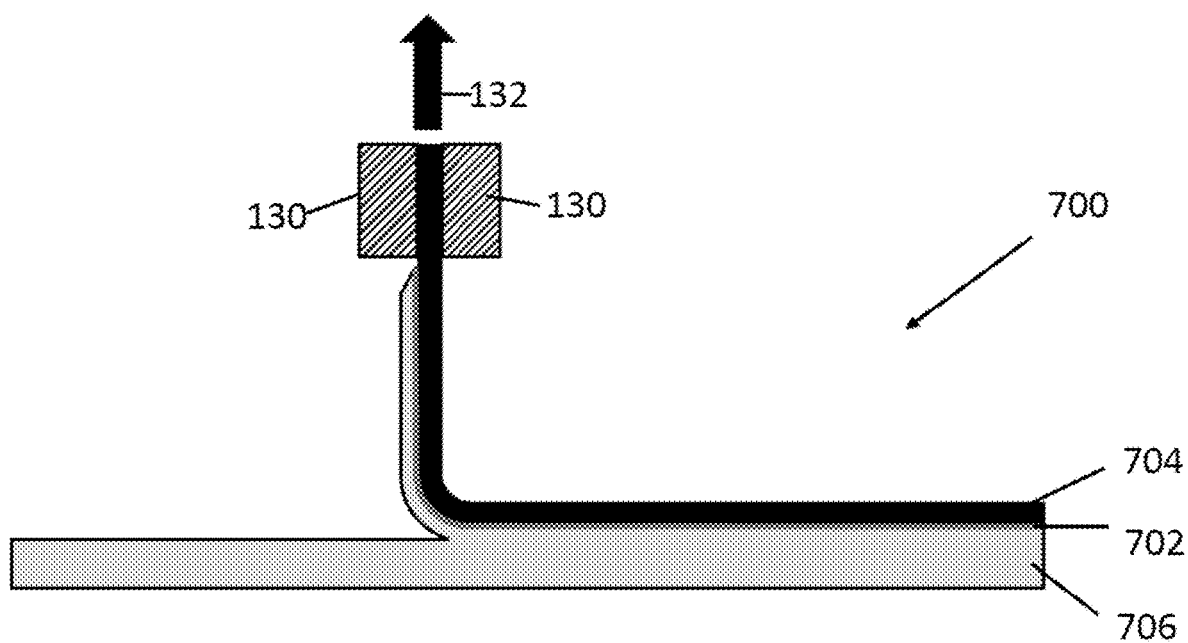
FIG. 7C is an illustration of an experimental setup for bonding strength measurement of a reference example structure in which a first polymer and a second polymer are bonded by a chemical glue.

With reference to FIG. 7C, there is shown a reference example structure 700 in which the first polymeric material 704 and the second polymeric material 706 were bonded by a chemical glue 702 such as benzophenone, and the same peeling test was applied to the structure 700.

Figure 8:
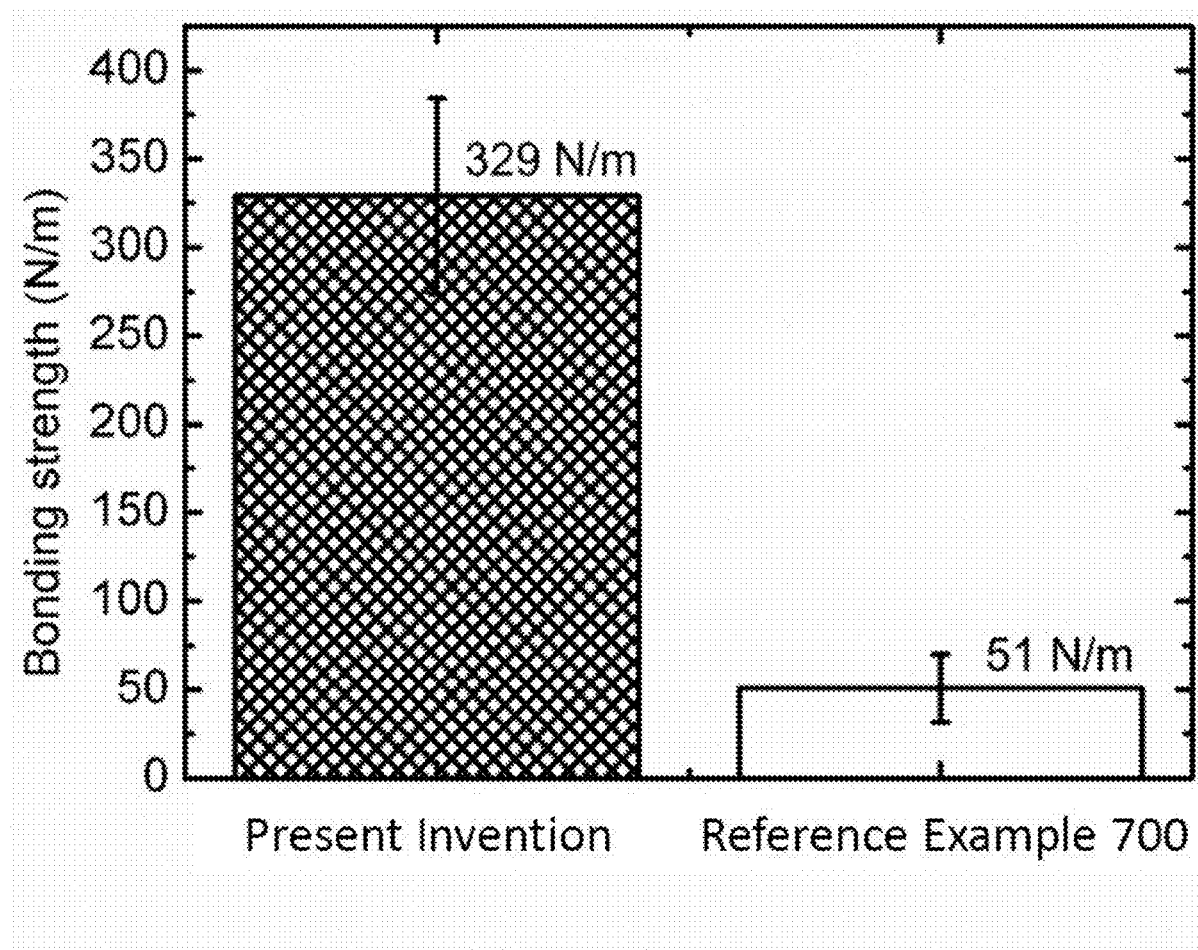
FIG. 8 is a plot showing comparison of the bonding strength between a hybrid polymeric structure shown in FIG. 7B and a reference example structure shown in FIG. 7C.

Referring to FIG. 8, there is shown a bar chart representing the experimental results of the peeling tests. The gridded column represents the measured bonding strength of the hybrid polymeric structure 102 fabricated in the present invention; the blank column represents the bonding strength of the reference example 700. The results indicate that the bonding strength of the hybrid polymeric structure 102 fabricated in the present invention is 329 N/m, which is 6.5 times higher than that of the reference example structure 700. These results indicate the mechanical stiffness of the hybrid polymeric structure 102 fabricated by 3D printing can be enhanced.

It will be appreciated by persons skilled in the art that numerous variations and/or modifications may be made to the invention as shown in the specific embodiments without departing from the spirit or scope of the invention as broadly described. The present embodiments are, therefore, to be considered in all respects as illustrative and not restrictive.

Any reference to prior art contained herein is not to be taken as an admission that the information is common general knowledge, unless otherwise indicated.

The invention claimed is:

1. A method for connecting two polymeric layers with a hybrid polymeric structure of a first polymeric material combined with a second polymeric material, the method comprising the steps of:
    providing a portion of a first polymeric layer of the first polymeric material with a first three-dimensional network by:
        pouring a precursor of the first polymeric material into a mold to form the base of the first polymeric material;
        printing a plurality of two-dimensional network structure with the first polymeric material on the base so as to form the first three-dimensional network on the base; and
        curing the base and the first three-dimensional network simultaneously;
    such that the first polymeric material includes the base chemically bound to the first three-dimensional network; and
    providing a portion of a second polymeric layer of the second polymeric material with a second three-dimensional network;
    wherein the first three-dimensional network defines a cavity with a plurality of interconnected portions within the first three-dimensional network;
    wherein the second polymeric material substantially occupies the cavity of the first three-dimensional network, and defines the second three-dimensional network;
    wherein the first three-dimensional network and the second three-dimensional network are arranged to physically engage with each other so as to form a unified structure combining the first polymeric material and the second polymeric material.

2. The method of claim 1, wherein the first polymeric material entangles with the second polymeric material.

3. The method of claim 1, wherein the first three-dimensional network is arranged in a scaffold structure.

4. The method of claim 1, wherein the step of providing the portion of the second polymeric layer of the second polymeric material with the second three-dimensional network comprising the step of filling the cavity of the first three-dimensional network with a precursor of the second polymeric material and curing the precursor of the second polymeric material.

5. The method of claim 4, wherein the precursor of the second polymeric material includes a liquid precursor.

* * * * *